United States Patent [19]
Carothers et al.

[11] Patent Number: 5,398,967
[45] Date of Patent: Mar. 21, 1995

[54] AIR BAG INFLATOR

[75] Inventors: D. Gordon Carothers, Willowdale; Tibor Martini, Toronto, both of Canada

[73] Assignee: Precision Engineering Co., Rexdale, Canada

[21] Appl. No.: 108,319

[22] Filed: Aug. 18, 1993

[51] Int. Cl.6 .............................................. B60R 21/10
[52] U.S. Cl. .................................... 280/741; 280/742
[58] Field of Search ............... 280/728, 736, 737, 741, 280/742

[56] References Cited

U.S. PATENT DOCUMENTS

| | | |
|---|---|---|
| 3,810,523 | 5/1974 | Yamaguchi et al. . |
| 3,843,152 | 10/1974 | Nonaka . |
| 3,907,330 | 9/1975 | Kondo et al. . |
| 3,958,949 | 5/1976 | Plantif et al. . |
| 4,013,010 | 3/1977 | Schneiter et al. .................... 280/741 |
| 4,017,100 | 4/1977 | Gehrig et al. . |
| 4,068,862 | 1/1978 | Ishi et al. . |
| 4,131,299 | 12/1978 | Ono et al. . |
| 4,158,696 | 6/1979 | Wilhelm . |
| 4,178,017 | 12/1979 | Ishi et al. . |
| 4,278,638 | 7/1981 | Nilsson et al. . |
| 4,296,084 | 10/1981 | Adams et al. . |
| 4,370,930 | 2/1983 | Strasser et al. ....................... 280/741 |
| 4,530,516 | 7/1985 | Adams et al. . |
| 4,547,342 | 10/1985 | Adams et al. . |
| 4,552,380 | 11/1985 | Stevens . |
| 4,561,675 | 12/1985 | Adams et al. . |
| 4,711,466 | 12/1987 | Breed .................................. 280/741 |
| 4,722,551 | 2/1988 | Adams . |
| 4,793,631 | 12/1988 | Takada . |
| 4,805,930 | 2/1989 | Takada . |
| 4,877,264 | 10/1989 | Cuevas . |
| 4,902,036 | 2/1990 | Zander et al. . |
| 4,907,819 | 3/1990 | Cuevas . |
| 4,923,212 | 5/1990 | Cuevas . |
| 4,964,652 | 10/1990 | Karlow . |
| 4,989,895 | 2/1991 | Pearson et al. . |

FOREIGN PATENT DOCUMENTS

| | | |
|---|---|---|
| 3604843 | 8/1987 | Germany . |
| 4141902 | 7/1992 | Germany .......................... 280/741 |

OTHER PUBLICATIONS

Two pages from Moon Brothers Ltd catalogue, undated.

Primary Examiner—Kenneth R. Rice
Attorney, Agent, or Firm—Oldham, Oldham & Wilson Co.

[57] ABSTRACT

An inflator for a vehicular air bag. The inflator has a metal cover and metal base sealingly connected to each other by a weldless joint. The cover or the base has a circumferential lip defining a channel and a rim of the other of the cover and base is received within the channel. The cover and base are shaped such that an external portion of the lip abuts the other of the cover and base to form a joint which sealingly connects the cover and base. In a disclosed embodiment, the cover and base are of stamped metal and the base has a circumferential lip defining a channel or trough which receives an external circumferential lip portion of the lid, an external portion of the lip being in abutment with the cover, the channel and lip portions thus being shaped to interlock with each other.

13 Claims, 8 Drawing Sheets

AIR BAG INFLATOR

FIELD OF THE INVENTION

This invention relates to vehicular air bag inflators and housings therefor. In particular, this invention relates to an inflator housing for an air bag assembly to be mounted on a steering wheel in which the housing components are secured together by weldless joints.

BACKGROUND OF THE INVENTION

Air bags which inflate when an automobile is involved in a collision to offer protection to a passenger are becoming increasingly common as automobile equipment. To date, air bags are most commonly installed to protect a driver, although passenger air bags are also known. Such driver air bags are usually mounted at the center of a vehicle steering wheel, the size and shape of the compressed air bag and its inflator being largely dictated by the requirements of this location. There are many examples of inflators described in the patent literature.

The air bag is connected to an inflator in such a way that propellant gases emitted from the inflator cause inflation of the bag. Inflators related to the present invention include a housing having a propellant chamber surrounded by a filter chamber. There is also usually an ignitor chamber centered in the propellant chamber. The ignitor chamber contains an ignition squib and ignitor material. Housing walls between the chambers contain apertures for passage of gases from chamber to chamber when the inflator is activated, but it is important that propellant and ignition materials be protected from contact with moisture for the materials to remain effective. Moisture reacts with propellant compounds currently in common use, such as sodium azide compositions, diminishing their potential as gas generators. Housing apertures leading to the propellant and ignitor chambers are thus sealed against moisture ingress, the seals being sufficiently weak to break when the inflator is activated. The outermost wall of the inflator housing also contains apertures and this portion of the housing is commonly referred to as a diffuser.

The inflator squib is connected to one or more sensors located, for example, in the front bumper of the vehicle. When the vehicle is in a collision that activates the sensor, an electrical impulse is sent to the squib for activation thereof. The ignitor material explodes generating heat and hot gases which flow into the propellant chamber to activate the propellant. When the propellant is so activated, it generates a large volume of gas which travels through the filter chamber and diffuser apertures to inflate the bag and offer protection to a vehicle passenger.

Inflator housings related to the present invention generally include a base and an upper diffuser housing. These are separate components which are assembled to contain propellant material during manufacture of the inflator.

A practical requirement of an inflator for use as part of a vehicle air bag system is that the inflator pass what is known as a "bonfire" test. The inflator housing must not fail so as to create a hazard when subjected to heat sufficient to cause its contents to explode. One approach, as with the present invention, is for a housing to be of sufficient strength that when subjected to such conditions it resists explosion so as reduce the hazard to flying inflator parts. Another approach is to create a housing failure path along which gases released on explosion of inflator contents can flow under such conditions. An example of this latter approach is given in U.S. Pat. No. 4,902,036 of Zander et al., which issued Feb. 20, 1990, the specification of which is incorporated herein by reference.

It is generally advantageous for an inflator to be as lightweight as possible. In this way the inflator contributes as little as possible to the weight of the automobile. Inflator housings of aluminum have thus been considered to be advantageous, at least in this respect, to stainless steel housings. Examples of inflator housings including aluminum components are given in U.S. Pat. Nos. 4,530,516 (Adams et al., Jul. 23, 1985), 4,547,342 (Adams et.al., Oct. 15, 1985), and 4,561,675 (Adams et al., Dec. 31, 1985), the specifications of which are incorporated herein by reference.

It is also advantageous for an inflator housing to be simple to manufacture. It is thus desirable to avoid components which must be threaded together, such threadings requiring machining, which is relatively expensive. Further, welding of housing components containing explosive materials during manufacture is considered disadvantageous as it is necessary to avoid significant heat flow to explosive materials within the housing. Manufacture of the inflator disclosed in U.S. Pat. No. 4,547,342, for example, involves an inertia welding operation. An aluminum retaining ring holds gas generant pellets in place to keep them separated from the spinning inflator base during the welding process.

It will further be appreciated that reliance on materials which are generally inert are prefered for inflator housings. It is thus considered disadvantageous to rely on rubber or other organic polymer gaskets as sealants, since such materials generally degrade, if slowly, with time.

A non-welded inflator unit for automobile air bags is described in U.S. Pat. No. 4,923,212 of Cuevas issued May 8, 1990, the specification of which is incorporated herein by reference. A diffuser member and closure plate are sealed by magnaforming a peripheral lip of the diffuser member over the outer circumferential edge of the closure plate.

Another a non-welded gas generator with a rolled spun lip is described in U.S. Pat. No. 4,907,819 of Cuevas issued Oct. 31, 1989, the specification of which is incorporated herein by reference. A diffuser member and closure plate are mechanically sealed by rolling a peripheral lip portion of the diffuser member of the outer circumference edge of the closure plate. A locking ring is inserted against a bottom surface of the closure member within the periphery of the rolled lip, the locking ring being configured to engage an inner terminal edge portion of the lip.

SUMMARY OF THE INVENTION

The present invention is of an inflator for a vehicular air bag having a metal cover and metal base sealingly connected to each other by a weldless joint. The cover or the base has a circumferential lip defining a channel and a rim of the other of the cover and base is received within the channel. The cover and base are shaped such that an external portion of the lip abuts the other of the cover and base to form a joint which sealingly connects the cover and base.

In the preferred embodiment, the cover and base are of stamped metal and the base has a circumferential lip defining a channel or trough which receives an external circumferential lip portion of the lid, an external portion of the lip being in abutment with the cover, the channel and lip portions thus being shaped to interlock with each other.

The preferred embodiment, disclosed in greater detail below, includes a propellant chamber defined within an inner housing which itself is centered within the outer housing made up of the cover and base. The inner housing includes top and bottom metal members. The bottom member defines a circumferential trough into which is received a circumferential lip of the top member. The engaging portions are shaped such that an external portion of the lip abuts the top member to form a joint which sealingly connects the top and bottom members.

The preferred embodiment further comprises an annular filter chamber defined between the inner and outer housings. The filter chamber is further divided up into upper and lower compartments by a metal filter divider. In one preferred embodiment, the filter divider is in the shape of an inverted cup having a laterally extending rim or brim portion which extends radially outwardly and is sandwiched between the joining elements of the outer housing.

In one disclosed embodiment, the cover and base of the outer housing each has a surrounding sidewall and a radially outwardly directed collar extending radially outwardly of the sidewall so as to be laterally between the joint and sidewalls. As shown in the detailed description, the joint of the outer housing cover and base is at approximately half the height of the inflator. The external portion of the lip of the base thus abuts the collar of the cover. The underside of the lower collar, i.e., the collar of the base thus provides a surface against which a support may be abuttingly located during manufacture of the joint. This permits the joint to evenly ironed out.

In one embodiment, the inflator has a circumferential side wall extending between the joint and an upper surface of the cover. The filter divider acts as an internal circumferential member located radially inward of the joint and is in abutment with an inner portion of the side wall to provide support against forces acting radially inwardly during compression of the joint elements of the outer housing of the inflator.

Likewise, the bottom member of the inner housing has an upwardly offset portion located radially inward of the inner housing joint. A surrounding outwardly facing portion of the offset portion of the bottom member abuts an inwardly facing surrounding side wall of the top member so as to create a gap radially inward of the joint. The gap thus provides access for a support to abut against the inwardly facing portion of the bottom member to act against forces acting radially inwardly on the inner housing as the joint between the top and bottom members is formed.

In the preferred embodiment, the inflator includes a central ignitor chamber defined within a tube located at the center of the inflator. The base of the outer housing and the bottom member of the inner housing each have central apertures in communication with each other and the tube is inserted through the apertures. The tube has two compressed portions extending radially outwardly of the cylindrical portion of the tube. Surrounding portions of the base of the outer housing and bottom member of the inner housing are sealingly enveloped between the outwardly compressed tubular portions. The axially upper end of the tube includes a radially inwardly directed surrounding lip. The top member of the inner housing has a central aperture surrounded by a downwardly directed flange which protrudes into the tube, the outwardly facing portion of which abuts the lip of the tube. A rivet is received within the end of the tube to sealingly compress the tube lip and the flange together.

A squib and ignitor material are located in the ignitor chamber. Propellant material is located in the propellant chamber and filtering material is located within the two filter compartments.

Passage of gases from the central ignitor chamber to the surrounding propellant chamber is provided by apertures in the wall of the ignitor tube. The inner housing contains apertures leading to the upper filter chamber. These are sealed to prevent moisture from entering into the propellant chamber by a material that breaks upon the generation of explosive gases in the propellant chamber. The cover or diffuser of the outer housing includes apertures to direct propellant gases into an air bag suitably mounted to the inflator.

DETAILED DESCRIPTION OF A PREFERRED EMBODIMENT

Figure 1:
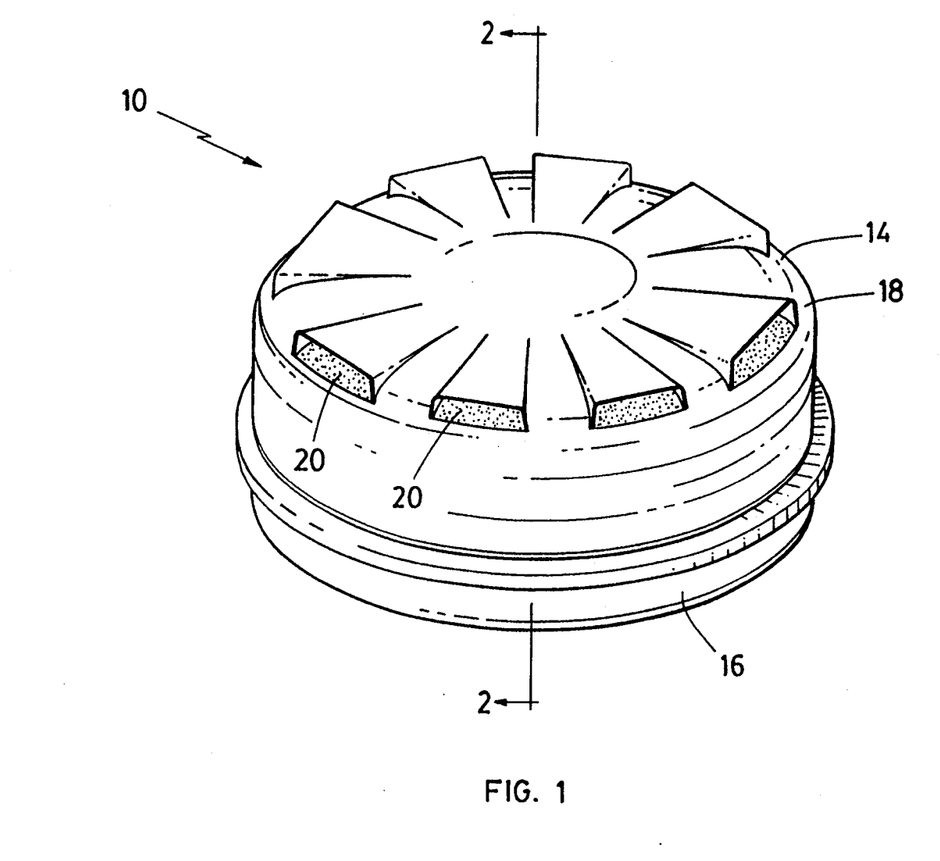
FIG. 1 is a side and top isometric view of a preferred embodiment inflator.
Figure 2:
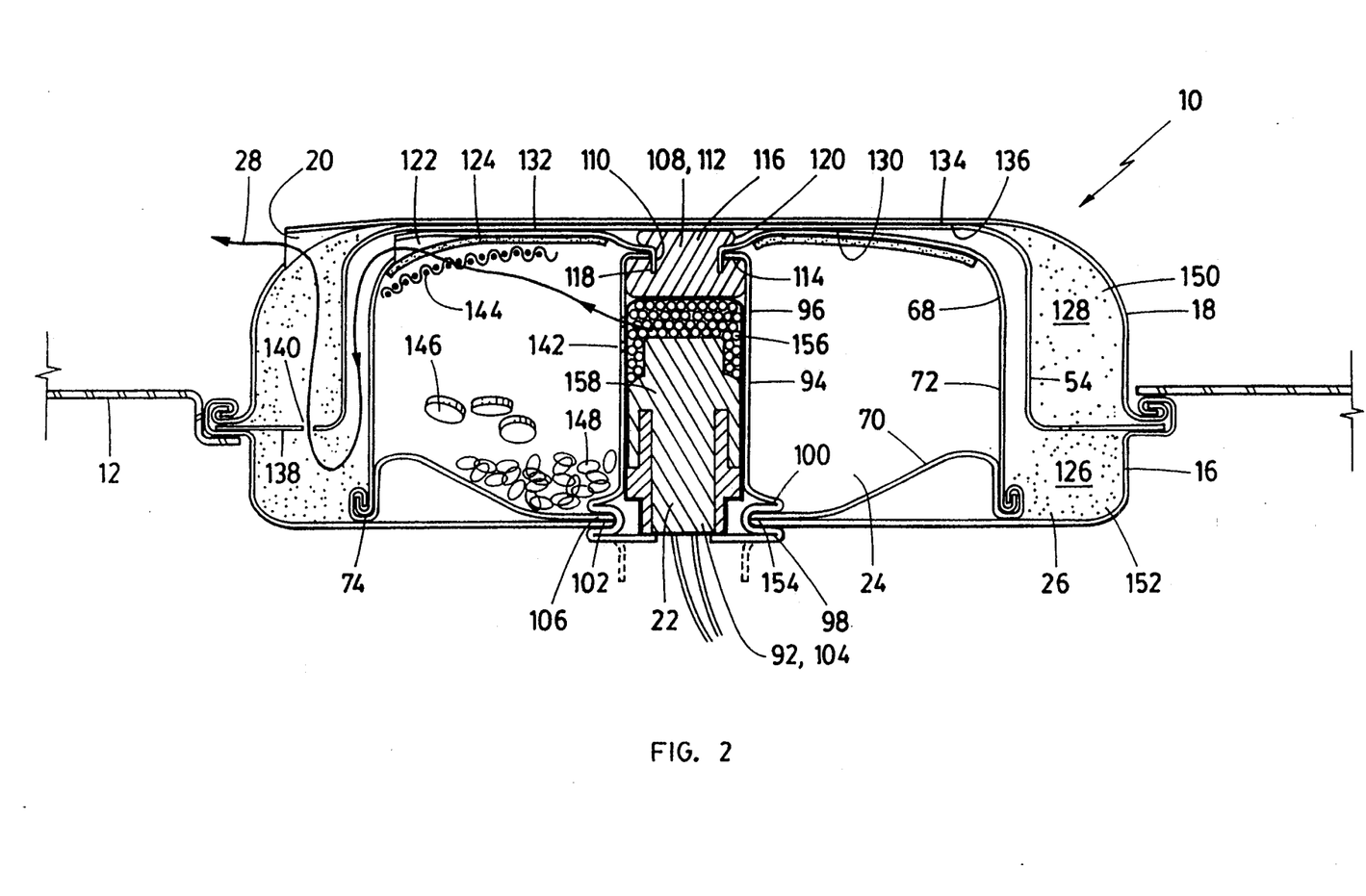
FIG. 2 is a sectional view of the FIG. 1 embodiment taken along line 2—2 of FIG. 1.

Turning to the drawings, particularly FIGS. 1 and 2, inflator 10 is shown mounted behind air bag module 12, the air bag itself not being illustrated. The inflator outer housing 14 includes base 16 connected to upper cover, or diffuser, 18 having apertures 20. The interior of the inflator housing includes ignitor chamber 22 located at its center, circumferentially surrounded by propellant chamber 24 which is in turn surrounded by filter chamber 26. Generally speaking, gas produced in the interior of the inflator is directed through the filter chamber and out of the inflator housing through the diffuser apertures to inflate the air bag along the path indicated by arrow 28. These various aspects of the inflator and its operation are described in greater detail below.

Figure 3:
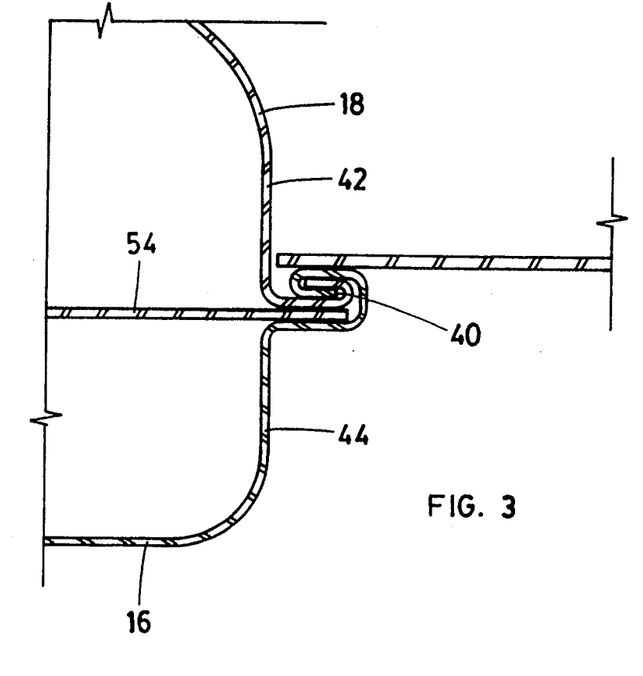
FIG. 3 is a sectional detail of a joint for a cover and base of an inflator housing of the FIG. 1 embodiment.
Figure 6:
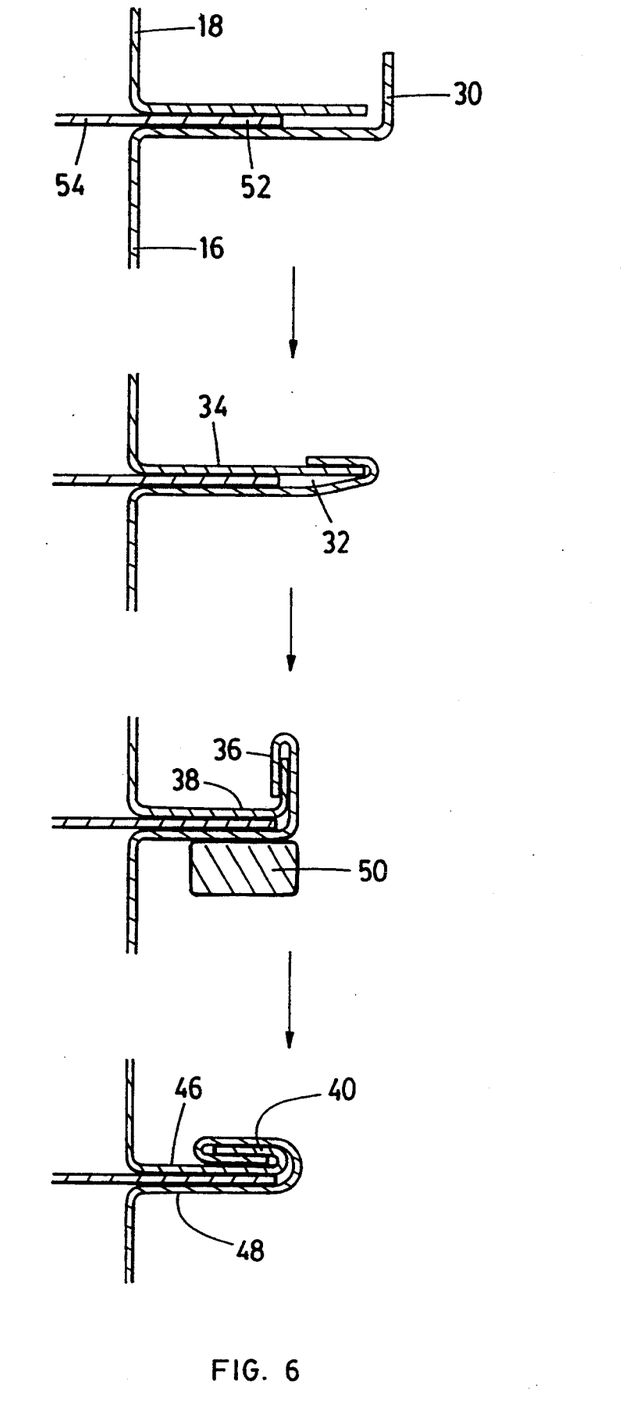
FIG. 6 shows an outline of the formation process of the joint between the cover and base of the housing of the FIG. 1 embodiment.

Outer housing base 16 and cover 18 are of stamped sheet metal of suitable maleability and strength, such as stainless steel having a gauge of about 0.7 mm. As best seen in FIGS. 3 and 6, base 16 includes circumferential lip 30 extending completely around the base and defining channel 32 into which is received rim 34 of the cover. The cover and base are further shaped, i.e., folded or bent such that in the final configuration, the external portion 36 of the lip abuts external surface 38 of the cover. Circumferential edges of the cover and base thus shaped so as to be hooked onto each other by air-tight joint 40 which sealingly connects the cover and base and secures the cover and base to each other so as to hold the housing together during operation of the inflator.

Upper cover 18 further includes surrounding side wall 42 and the lower base 16 includes surrounding side wall 44. Collars 46, 48 of the cover and base, respectively, extend radially outwardly of the side walls and in joint 40, external lip portion 36 abuts collar 46 of the cover. Collars 46, 48 coextend radially outwardly such that during formation of the joint, as the hooked portions are being pressed downwardly as in the final step shown in FIG. 6, a support 50, schematically illustrated, can be located under and in abutment with the collar of the base during joint formation so that the joint can be evenly compressed or ironed out.

Rim 52 of filter chamber divider 54 (described further below) is securely sandwiched between the collars of the cover and base and secured therebetween during formation of joint 40.

Figure 4:
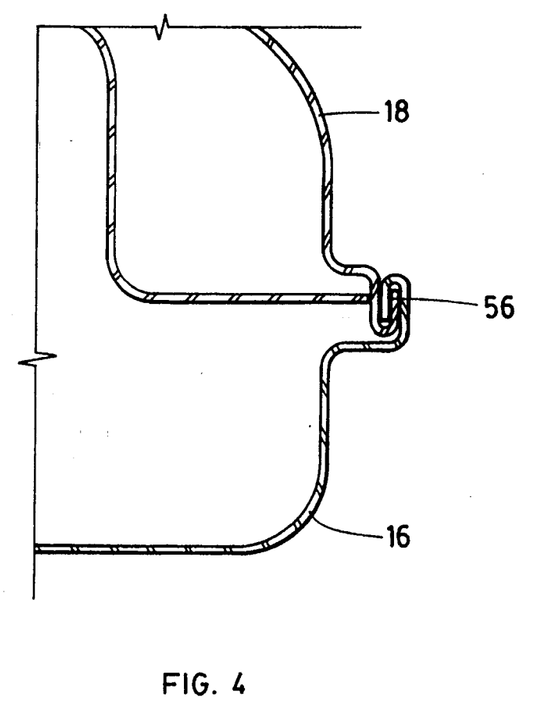
FIG. 4 is a sectional detail, similar to that of FIG. 3, of an alternate joint for the cover and base of the outer housing of the FIG. 1 embodiment inflator.
Figure 8:
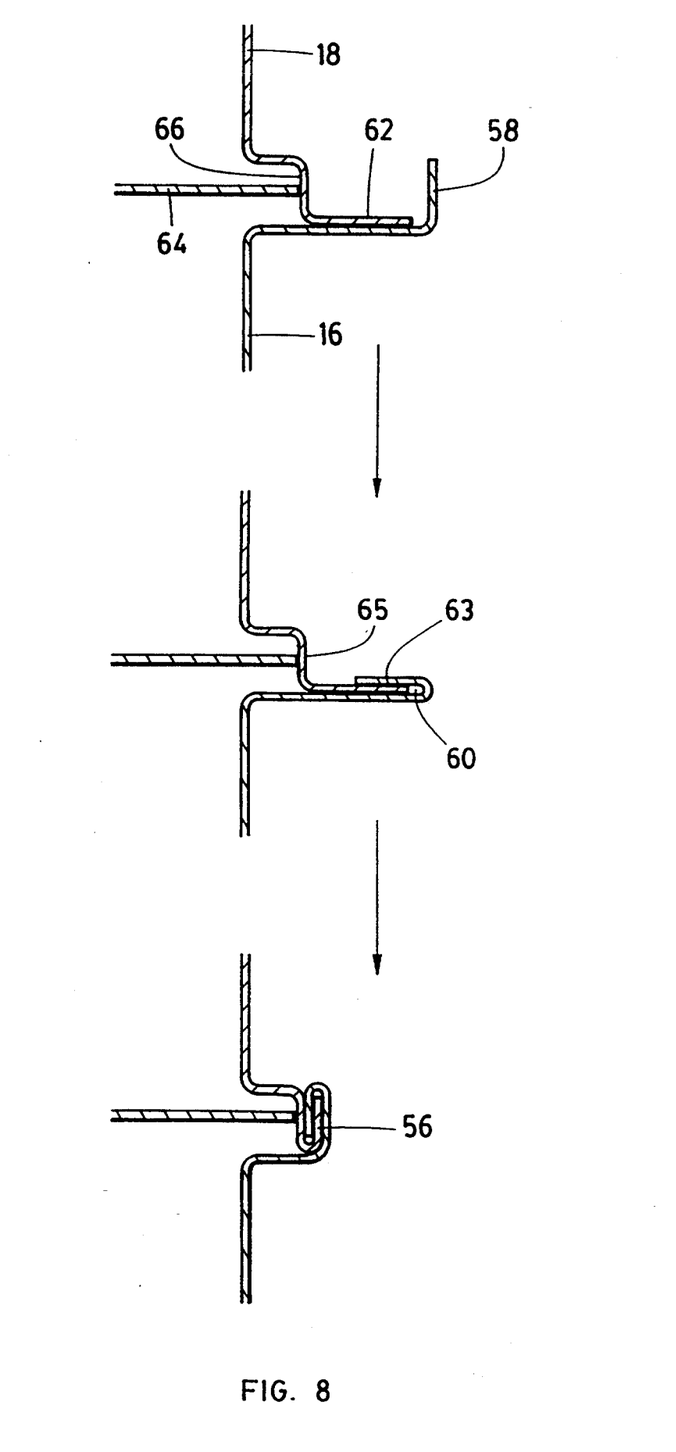
FIG. 8 shows an outline of the formation process of the alternate joint of FIG. 4.

An alternative joint 56 is shown in FIGS. 4 and 8. In common with joint 40, joint 56 includes base lip 58 defining circumferential channel or trough 60 into which is seated cover rim 62. External lip portion 63 is in abutment with cover external portion 65 within fully formed joint 56 so as to sealingly connect and secure together the cover arid base of the outer housing. In this arrangement internal filter chamber divider 64 is located directly behind i.e., radially inwardly of the joint. Divider 64 is in abutment with interior surface 66 of the cover and located to provide support for the housing against radially inwardly directed forces during joint formation as in the final step illustrated in FIG. 8.

Figure 5:
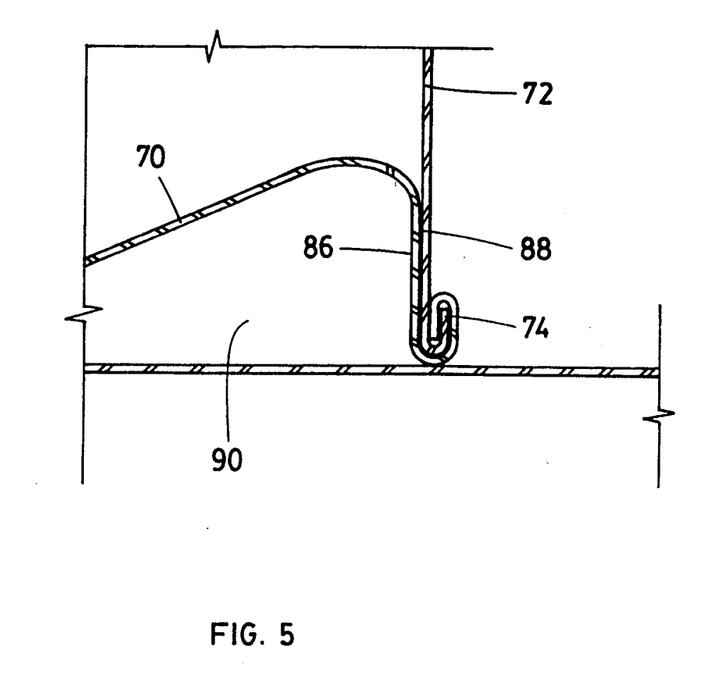
FIG. 5 is a sectional detail of a joint between upper and lower members of an inner housing of the FIG. 1 embodiment.
Figure 7:
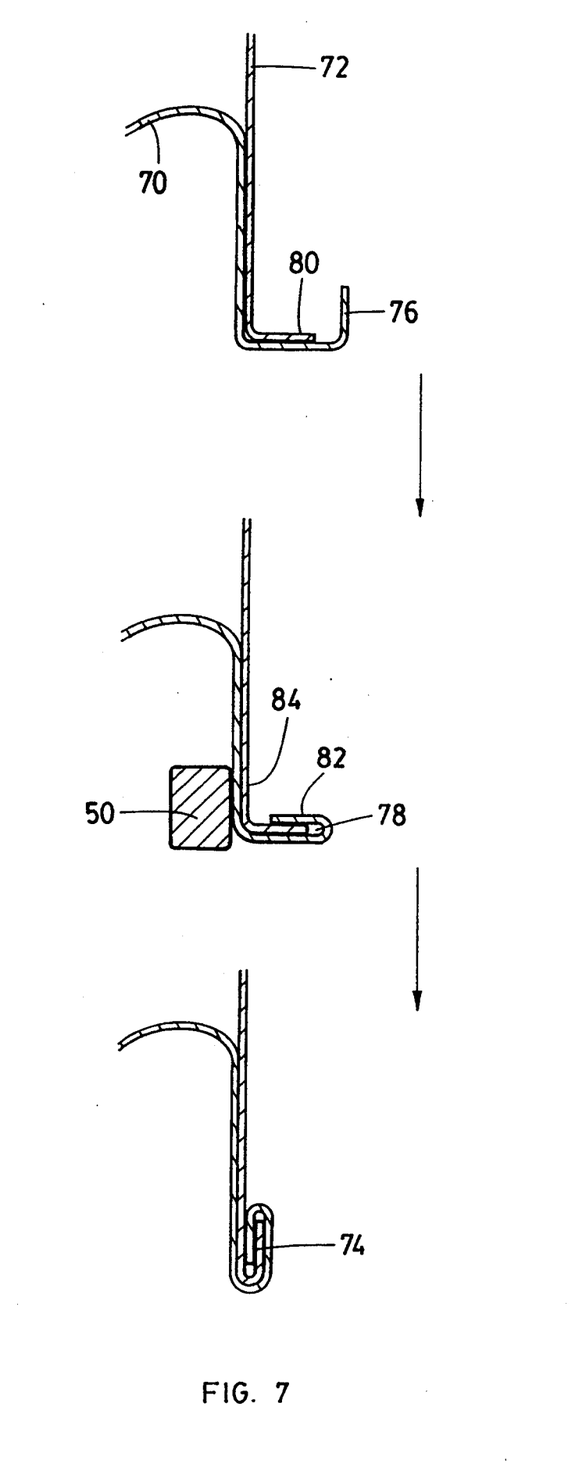
FIG. 7 shows an outline of the formation process of the joint between top and bottom members of the inner housing of the FIG. 1 embodiment.

Turning to FIGS. 5 and 7, inner housing 68 defines the exterior of, i.e., surrounds the propellant chamber. The inner housing includes bottom member 70 and top member 72 sealing connected at joint 74, best seen in FIG. 5. As with the above-described joints, joint 74 includes overlapping circumferential portions of the bottom and top members in a folded configuration. Lip 76 of the bottom member defines trough 78 into which interior is received edge 80 of the top or upper member. External portion 82 of the lip sealingly abuts against surrounding side wall 84 of the upper member of the inner housing in the fully formed joint. The peripheral region of bottom member 70 is offset axially upwardly towards the upper portion of top member of the inner housing such that surrounding wall portion 86 abuts inner portion 88 of the side wall of the upper member. The gap or cleft 90 created by the offset portion provides access for a separate, or external support 50 to abut against the surrounding portion of the bottom member radially inward of inner housing joint 74 during manufacture of the joint. Such a support permits appropriate radially inward pressures to be applied to the elements of the joint during its formation without radially inward collapse of the inner housing.

The arrangement of joint 74 sealingly connecting the upper and lower members of the inner housing illustrated in the figures can also be used for connecting and securing together the cover and base members of an external housing, if desired.

Base 16 is formed in the shape of a generally circular shallow cup with central opening 92 for receipt of ignitor casing 94 therethrough. Ignitor casing 94 includes tube 96 inserted axially through aperture 92. The tube is typically of the same type of metal as the outer housing of the inflator. The tube has lower annular compressed portion 98 and upper annular compressed portion 100 each of which extends radially outwardly of the central bore of the tube. Rim portion 102 of the base surrounding opening 92 is sealingly compressed or enveloped between the radially outwardly directed tube portions for a secure connection of the ignitor casing to the inflator base.

Propellant chamber 24 is contained between, that is defined by, ignitor casing 94, inner housing bottom member 70 and inner housing upper member 72, the bottom and upper members being stamped from metal similar to that of the outer housing components and having a gauge of about 1 min. Inner housing bottom member 70 has a central opening 104 of similar dimension to and in communication with that of the outer housing base. Inner rim 106 of the bottom member is similarly sealingly sandwiched between the outwardly radial portions of the tubular ignitor casing. The top and bottom members of the inner housing are connected by circumferential joint 74 described previously.

Inner housing upper member 72 is in the shape of an inverted, relatively deep cup having central upper opening 108. Opening 108 is surrounded by downwardly depending circular flange 110 of the upper member of the inner housing. Ignitor tube 96 includes upper opening 112. Radially inwardly directed lip 114 of the tube surrounds and abuts the downwardly directed flange 110, that is, flange 110 is received within opening 112. Rivet 116, located in the end of the upper end of the tube, includes upwardly opening annular channel 118 for receipt of flange 110. Rivet upper perimeter 120 is drawn to sealingly compress the lip and upper member portions together and to secure the flange within the channel to provide a secure sealed joint between the upper member of the inner housing and the tube. Upper member 72 has apertures 122 which are sealed by aluminum foil tape 124.

Filter chamber 26 generally surrounds the propellant chamber and is divided into lower and upper compartments 126, 128 by divider 54. The divider is in the shape of an inverted cup, having interior surface 130 which abuts outer surface 132 of upper member 72 and the divider has outer upwardly facing surface 134 abutting inner surface 136 of the cover of the outer housing. The divider has a radially outwardly directed annular skirt 138 with apertures 140 evenly spaced about its circumference. Rim 52 of the skirt of the divider is sandwiched between the cover and base joint elements, as previously described.

Ignitor tube 96 is of material similar to that of the housing, about 1 mm stainless steel. The tube would generally be seamless, but a welded-mandrel drawn tube might also be suitable. Upper axial end includes inwardly directed surrounding lip 114. There are typically between six and eight holes 142 in the side of the tube for passage of ignitor gases, the holes being formed by drilling or piercing.

Generally speaking, the inflator is assembled as follows. The ignitor tube casing is pre-formed to have upper, i.e., interior, radial protrusion 100 in place. Into upper hollow end 112 are inserted flange 110 of the upper member of the inner housing and cold headed or machined rivet 116, the upper portion being dimensioned for insertion through central opening 108 of the upper member of the inner housing. The three components are fastened together by forming the rivet into the shape shown in FIG. 2. Sealant tape 124 is applied to cover nozzles 122 of the top member of the inner housing. With the upper member of the inner housing oriented in an inverted position to that shown in FIG. 2, inner filter screen 144 is placed into the inner housing, and propellant 146 added. Filler pad 148 is placed into the upper member of the inner housing and the inner housing bottom member 70 is placed into position with the lower end of the ignitor tube protruding through central aperture 104. Joint 74 is formed to join the upper and lower members of the inner housing according to the steps shown in FIG. 7. Housing base 16 is put into place with the lower end of the ignitor tube protruding through its central aperture 92. Joint 154 is made by axial compression of tube 94 to form bulge 98 with inner rim portions 102, 106 sandwiched between radially outwardly directed portions 98, 100. At this point, the lowermost portion of the tube extends axially downwardly of the tube, as shown in phantom in FIG. 2. Filter material 150 and divider 54 are moved into place, as is filter material 152. Partially formed upper cover 18 is located with respect to the divider and housing base and joint 40 is formed according to the steps shown in FIG. 6. Finally, the inflator is armed by installation of ignitor material 156 and squib 158 in ignitor chamber 22. Ignitor chamber 22 is sealed from the outside by closure of the lower axially end of ignitor tube 96 against the lower end of the squib. It would generally be unecessary to seal the ignitor chamber from the propellant chamber as the squib and ignitor are generally available as an assembled moisture proof unit.

Prior to assembly, the metal top and bottom of the inner housing are partially formed by a stamping process so that their rim portions mate to permit shaping into the configuration of joint 74. The formation process is outlined in FIG. 7. Likewise, the cover and base pieces are pre-formed in a stamping process so that rim portions of each can be shaped into the configuration of joint 40 shown in FIGS. 2 and 3. The formation of the joint is outlined in FIG. 6. Correspondingly, formation of joint 56 is outlined in FIG. 8. Joint formation would generally be by means of a rollforming process, but a crimping process would also be suitable.

The illustrated embodiment is thus assembled without the use of welding equipment.

The protruding ridge of the joint of the outer housing provides a convenient means for mounting an air bag assembly on the inflator by clamping means.

In operation, squib 158 is electrically activated, to ignite ignitor material 156. An ignitor arrangement such as that described in U.S. Pat. No. 4,902,036 would be suitable. Tablets 146 react to produce gases, the expanding pressure of which breaks seals 124. Particulate matter is filtered from the gases and the gases are cooled as they flow through the filters contained in the filter chamber, generally along the ciruitous path indicated by arrow 28, to emerge from the inflator through diffuser apertures 20 to expand an attached air bag. The generally concentric arrangement of the ignitor, propellant and filtering chambers and the symmetrical arrangement of apertures through which expansive gases are directed is well known in the art. That is, arrangements in which gas flow is directed in radially symmetrical directions is generally preferred.

It will be understood that the foregoing description is the preferred embodiment and that the scope of protection is defined in the appended claims.

What is claimed is:

1. An inflator for a vehicular air bag, the inflator having an outer housing, an ignitor located centrally thereof, a propellant chamber circumferentially surrounding the ignitor, an a filter chamber circumferentially surrounding the ignitor chamber, the outer housing comprising:

a metal cover and a metal base wherein one or the other of the cover has a circumferential lip defining a channel and a rim of the other of the cover and base is received with the channel, and the cover and base are shaped such that an external portion of the lip abuts the other of the cover and base to form a joint which sealingly connects the cover and base and secures the cover and base together during operation of the inflator.

2. The inflator of claim 1 wherein the cover has a circumferential side wall extending between the joint and an upper surface of the cover and a circumferential portion of the base located radially inward of the joint is offset toward the upper surface of the cover and abuts an inner portion of the side wall so as to provide abutting access for an external support against the circumferential portion of the base radially inward of the joint during manufacture thereof.

3. The inflator of claim 1 wherein the cover has a circumferential side wall extending between the joint and an upper surface of the cover and further comprising an internal circumferential member located radially inward of the joint and in abutment with an inner portion of the side wall to provide support against radially inward compression of the housing during formation of the joint.

4. The inflator of claim 1 wherein each of the cover and the base has a surrounding side wall and a radially outwardly directed collar extending between the side wall and the joint, the external portion of the lip abutting the collar of the other of the cover and the base and an outer surface of the collar of the one of the cover and base coextending with the collar of the other of the cover and base to provide abutting access for a support against an external surface thereof during manufacture of the joint.

5. The inflator of claim 5 wherein the propellant chamber is surrounded by an inner housing having a top metal member and a bottom metal member, wherein one or the other of the top and bottom members has a circumferential lip defining a trough and an edge of the other of the top and bottom members is received within the trough, and the top and bottom members are shaped such that an external portion of the lip abuts the other of the top and bottom members to form a joint which sealingly connects the top and bottom members.

6. The inflator of claim 5 wherein the top member has a surrounding side wall extending between the inner housing joint and an upper surface of the top member and a surrounding portion of the bottom member radially inward of the inner housing joint is offset toward the upper surface of the top member and abuts an inner portion of the surrounding side wall to provide abutting access for a support against the surrounding portion of the bottom member radially inward of the inner housing joint during manufacture thereof.

7. The inflator of claim 5 further comprising a divider which divides the filter chamber into first and second compartments and wherein a rim of the divider is sandwiched between the collars of the cover and base.

8. The inflator of claim 7 wherein the base and bottom members have central apertures in communication with each other and a tube inserted through the apertures is located to define an ignitor chamber central of the propellant chamber, the tube having two compressed portions extending radially outwardly and enveloping therebetween portions of the base and bottom member surrounding the tube for a sealed connection therebetween.

9. The inflator of claim 8 wherein the axially upper end of the tube includes a radially inwardly directed lip, the top member of the inner housing has a central aperture surrounded by a downwardly directed flange located radially inwardly of and in abutment with the lip of the tube, and a rivet received in the end of the tube to sealingly compress the tube lip and flange together.

10. An inflator for a vehicular air bag, the inflator having an outer housing, an ignitor located centrally thereof, a propellent chamber circumferentially surrounding the ignitor, and a filter chamber circumferentially surrounding the ignitor chamber, wherein:

the outer housing comprises a stamped metal cover and a stamped metal base wherein the base has a circumferential lip defining a channel and the cover has a rim received within the channel, and the cover and base are shaped such that an external portion of the lip abuts the cover to form a joint which sealingly connects the cover and base and secures the cover and base together during operation of the inflator;

each of the cover and the base has a surrounding side well and a radially outwardly directed collar extending between the side wall and the joint, the external portion of the lip abutting the collar of the cover and an outer surface of the collar of the base coextending with the collar of the cover to provide abutting access for a support against an external surface thereof during manufacture of the joint;

the propellent chamber is surrounded by an inner housing having a top stamped metal member and a bottom stamped metal member, wherein the bottom member has a circumferential lip defining a trough and a circumferential edge of the top member is received within the trough, and the top and bottom members are shaped such that an external portion of the lip abuts the top member to form a joint which sealingly connects the top and bottom members and secures the top and bottom members together during operation of the inflator;

the top member has a surrounding side wall extending between the inner housing joint and an upper surface of the top member and a surrounding portion of the bottom member radially inward of the inner housing Joint is offset toward the upper surface of the top member and abuts an Inner portion of the surrounding side wall to provide abutting access for a support against the surrounding portion of the bottom member radially inward of the inner housing joint during manufacture of the joint;

the filter chamber is defined between the inner housing and the outer housing and there is a metal divider which divides the filter chamber into two compartments and a rim of the divider is sandwiched between the collars of the cover and the base;

the base and bottom members have central apertures in communication with each other and a tube inserted through the apertures is located to define an ignitor chamber central of the propellent chamber, the tube having two compressed portions extending radially outwardly and enveloping therebetween portions of the base and bottom member surrounding the tube for sealed connection therebetween; and the axially upper end of the tube includes a radially inwardly directed lip, the top member of the inner housing has a central aperture surrounded by a downwardly directed flange located radially inwardly of and in abutment with the lip of the tube, and there is a rivet received in the end of the tube to sealingly compress the tube lip and flange together.

11. The inflator of claim 10, further comprising:
an ignitor an electrically activatable squib and ignitor material contained within the ignitor chamber;
propellant material contained within the propellant chamber;
filters contained within each of the filter chamber compartments; and wherein,
the tube contains apertures for passage of ignition gases from the ignitor chamber to the propellant chamber, the top member of the inner housing has apertures for passage of propellant gases from the propellant chamber to a first compartment of the filter chamber, the metal divider has apertures to direct propellant gases from the first compartment of the filter chamber to a second compartment of the filter chamber, and the outer housing has apertures located to direct propellant gases from the second compartment to the exterior of the inflator.

12. The inflator of claim 11, wherein the top member apertures are sealed with a material to preclude ingress of moisture into the inner housing and which breaks to permit said passage of propellant gases when the gases are generated in response to ignition of the ignitor material.

13. The inflator of claim 12 wherein the joint of the outer housing is rollformed and the joint of the inner housing is rollformed.

* * * * *

UNITED STATES PATENT AND TRADEMARK OFFICE
CERTIFICATE OF CORRECTION

PATENT NO. : 5,398,967
DATED : Mar. 21, 1995
INVENTOR(S) : Carothers, et al

It is certified that error appears in the above-indentified patent and that said Letters Patent is hereby corrected as shown below:

Claim 1, line 4 (column 8 of the printed patent), "an" should be --and--; line 8 (column 8, line 12), --and base--should be inserted after "cover"; line 10 (column 8, line 14), "with" should be --within--.

Col. 8, claim 5, line 1, "5" should be --4--

Claim 10, line 16 (column 9, line 34), "well" should be --wall--; line 38 (column 9, line 56), "Joint" should be --joint--; line 39 (column 10, line 1), "Inner" should be --inner--.

Signed and Sealed this

Nineteenth Day of September, 1995

BRUCE LEHMAN

Attest:

Attesting Officer

Commissioner of Patents and Trademarks